United States Patent
Fleck et al.

(10) Patent No.: US 11,319,086 B2
(45) Date of Patent: May 3, 2022

(54) METHOD AND SYSTEM FOR ALIGNING A TAXI-ASSIST CAMERA

(71) Applicant: Rosemount Aerospace Inc., Burnsville, MN (US)

(72) Inventors: Travis W. Fleck, Farmington, MN (US); Gerald L. Brown, Savage, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 552 days.

(21) Appl. No.: 15/161,696

(22) Filed: May 23, 2016

(65) Prior Publication Data

US 2017/0334578 A1    Nov. 23, 2017

(51) Int. Cl.
| | |
|---|---|
| *B64D 47/08* | (2006.01) |
| *G06K 9/62* | (2022.01) |
| *G06K 9/46* | (2006.01) |
| *G06K 9/52* | (2006.01) |
| *G06T 7/60* | (2017.01) |

(Continued)

(52) U.S. Cl.
CPC ......... *B64D 47/08* (2013.01); *G06K 9/00624* (2013.01); *G06K 9/3216* (2013.01); *G06K 9/4604* (2013.01); *G06K 9/4609* (2013.01); *G06K 9/52* (2013.01); *G06K 9/6215* (2013.01);

(Continued)

(58) Field of Classification Search
None
See application file for complete search history.

(56) References Cited

U.S. PATENT DOCUMENTS

| | | | |
|---|---|---|---|
| 4,884,145 A | 11/1989 | Kaye et al. | |
| 2006/0290950 A1* | 12/2006 | Platt | G06T 3/4053 |
| | | | 358/1.2 |

(Continued)

FOREIGN PATENT DOCUMENTS

EP    2495168 A1 *    9/2012    ............. B64D 47/08

OTHER PUBLICATIONS

Huttenlocher, Daniel P., "Comparing Images Using the Hausdorff Distance", IEEE Transactions on Pattern Analysis and Machine Intelligence, Institute of Electrical and Electronic Engineers, vol. 15, No. 9, Sep. 1993, 14 pages.*

(Continued)

*Primary Examiner* — Heather R Jones
(74) *Attorney, Agent, or Firm* — Kinney & Lange, P.A.

(57) ABSTRACT

Apparatus and associated methods relate to aligning a taxi-assist camera such that each image frame of real-time video that the camera generates has a standard presentation format. The taxi-assist camera is configured to be mounted on an aircraft and oriented such that each image frame includes both a specific feature of the aircraft and of nearby objects external to the aircraft. The specific feature of the aircraft is detected and a location within the image frame of the specific feature is determined. The determined location within the image frame is compared with a reference location. A transformation operator is generated to transform the image frame such that the specific feature of the aircraft will be located within the image at a location corresponding to the reference location. The transformation operator is then applied to each of the image frames of the real-time video that the camera generates.

18 Claims, 8 Drawing Sheets

(51) Int. Cl.
  *H04N 17/00* (2006.01)
  *G06T 3/60* (2006.01)
  *G06K 9/00* (2022.01)
  *G06K 9/32* (2006.01)
  *G06T 7/13* (2017.01)

(52) U.S. Cl.
  CPC ............... *G06T 3/60* (2013.01); *G06T 7/13* (2017.01); *G06T 7/60* (2013.01); *H04N 17/002* (2013.01)

(56) References Cited

U.S. PATENT DOCUMENTS

| | | |
|---|---|---|
| 2011/0282580 A1 | 11/2011 | Mohan |
| 2012/0026352 A1* | 2/2012 | Natroshvili ............... G06T 7/13 348/222.1 |
| 2012/0224058 A1 | 9/2012 | Benning et al. |
| 2013/0027554 A1* | 1/2013 | Meadow ...................... 348/144 |

OTHER PUBLICATIONS

Extended European Search Report, for European Patent Application No. 17171093.2, dated Oct. 12, 2017, 11 pages.
European Office Action dated Oct. 29, 2018, received for corresponding European Application No. 17171093.2.

* cited by examiner

METHOD AND SYSTEM FOR ALIGNING A TAXI-ASSIST CAMERA

BACKGROUND

Each year, significant time and money are lost due to commercial aircraft accidents and incidents during ground operations, of which significant portions occur during taxiing maneuvers. During taxi operations, aircrafts share the roadways with other aircraft, fuel vehicles, baggage carrying trains, and many other objects. Aircrafts often taxi to and/or from fixed buildings and other fixed objects. Should the wheels of an aircraft traverse the edge of the roadways or should the aircraft collide with any of the objects sharing the roadways, the aircraft might require repair and/or recertification before resuming operation. The cost of repair and recertification, as well as the lost opportunity costs associated with the aircraft being unavailable for use can be very expensive.

Pilots are located in a central cockpit where they are well positioned to observe objects that are directly in front of the fuselage of the aircraft. Wings extend laterally from the cabin in both directions. Some commercial and some military aircraft have large wingspans, and so the wings on these aircraft laterally extend a great distance from the cabin. Some commercial and some military aircraft have engines that hang below the wings of the aircraft. Pilots, positioned in the cabin, can have difficulty knowing the risk of collisions between the wingtips and/or engines and other objects external to the aircraft.

Taxi-assist cameras are used on aircraft to provide the pilot with real-time video of scene(s) external to the aircraft. Such taxi-assist cameras can be located on the aircraft and oriented so as to capture scenes external to the aircraft that may be difficult for the pilot to otherwise see. Such scenes can make the pilot aware of nearby objects external to the aircraft. The pilot's awareness of these nearby objects can alert the pilot to potential collisions, thus helping a pilot to navigate around these nearby objects. Pilots may expect that these cameras are positioned similarly from aircraft to aircraft, and camera alignment is performed so that pilots, who command different aircraft at different times, can expect a standard view for images obtained from taxi-assist cameras and displayed on cockpit displays.

Aligning these taxi-assist cameras can require two or more technicians who must communicate via electrical communications systems. A first technician may be located in the cockpit and may watch a display screen displaying video generated by one or more taxi-assist cameras externally mounted to the aircraft. The second technician may be located where the orientation of these taxi-assist cameras is controlled (e.g., in an electronics bay of the aircraft). The first technician may communicate to the second technician using remote communications devices as to how the scene is framed while the second technician adjusts the camera orientation. It would be beneficial to automate the adjustment of the orientation of taxi-assist cameras.

SUMMARY

Apparatus and associated devices relate to an alignment system for aligning a taxi-assist camera. The alignment system includes the taxi-assist camera configured to be mounted to an aircraft and oriented to provide real-time video during taxi operations of both a specific feature(s) of the aircraft and of nearby objects external to the aircraft. The real-time video includes a time sequence of image frames, each image frame including a two-dimensional array of pixel data. The alignment system includes a feature detector configured to detect the specific feature(s) of the aircraft within at least one of the image frames. The alignment system includes a feature comparator configured to compare the detected specific feature(s) within the at least one of the image frames, with a reference feature within a reference image. The alignment system also includes an image transformation operator configured to transform each of the image frames of the real-time video such that the detected specific feature(s) is located at a two-dimensional location within each of the image frames. The two-dimensional location within each of the image frames corresponds to a two-dimensional reference location of the reference feature within the reference image.

In some embodiments, a method for aligning a taxi-assist camera of an aircraft to a standard view. The method includes the step of obtaining a first image from a camera mounted on an aircraft, the first image comprising a two-dimensional array of pixel intensity data. The method includes the step of calculating edges within the obtained first image. Edges are a function of differences between pixel intensity data of pixels within a local vicinity. The method includes the step of creating a second image comprising a two-dimensional array of edge intensity data. The method includes the step of thresholding the second image to zero the magnitude of edge intensity data that are below a predetermined threshold, while edges intensity data that are above the predetermined threshold survive. The method includes the step of selecting, from the surviving edges, a first target edge oriented in a first orientation and a second target edge oriented in a second orientation. The first and second orientations provide a basis that spans the two-dimensional array of edge intensity data. The method includes the step of calculating a first offset between the selected first edge and a first reference location and a second offset between the selected second edge and a second reference location. The method includes the step of generating a transformation operator that transforms the second image such that the selected first edge is located at the first reference location and the selected second edge is located at the second reference location. The method also includes the step applying the generated transformation n operator in real-time to imagery obtained by the camera mounted on the aircraft.

DETAILED DESCRIPTION

Apparatus and associated methods relate to aligning one or more taxi-assist cameras such that each image frame of real-time video that these camera generate has a standard presentation format. The taxi-assist cameras are configured to be mounted on an aircraft and oriented such that each image frame includes both a specific feature of the aircraft and of nearby objects external to the aircraft. The specific features of the aircraft are detected and locations within the image frame of these specific features are determined. The determined locations within the image frame are compared with reference locations for those specific features. A transformation operator is generated to transform the image frames such that the specific features of the aircraft will be located within the image at locations corresponding to the reference locations. The transformation operator is then applied to each of the image frames of the real-time video that the camera generates.

Figure 1A:
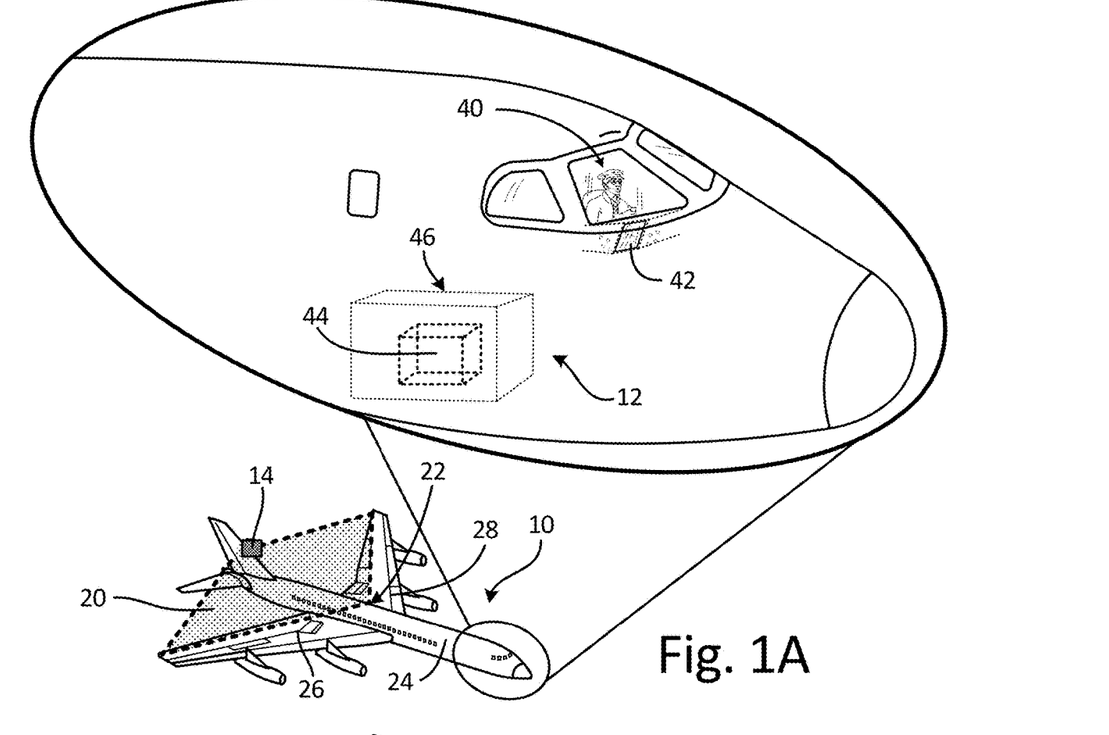
FIGS. 1A-1C are perspective views of an aircraft equipped with taxi-assist cameras mounted at various locations on the aircraft.
Figure 1B:
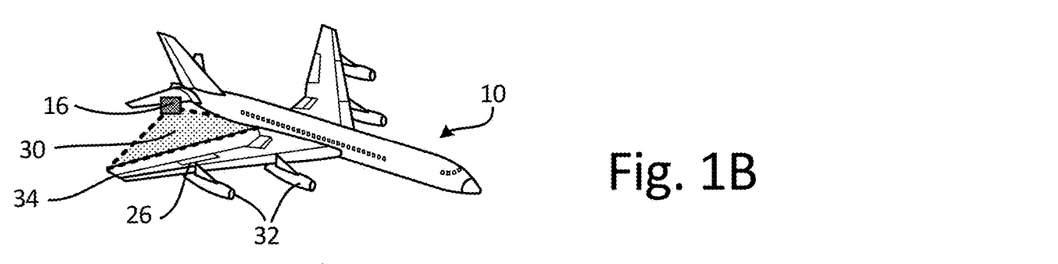
Figure 1C:
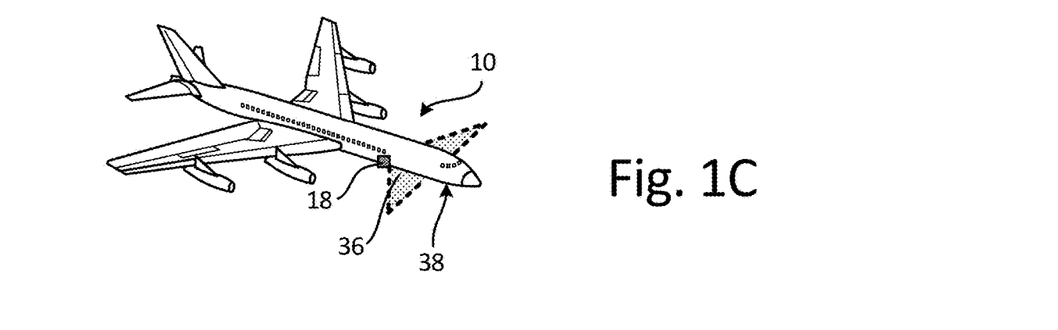

FIGS. 1A-1C are perspective views of an aircraft equipped with taxi-assist cameras mounted at various locations on the aircraft. In FIGS. 1A-1C, aircraft 10 is equipped with taxi-assist camera system 12. Taxi-assist camera system 12 includes taxi-assist cameras 14, 16, 18 mounted at various locations on aircraft 10. In FIG. 1A, taxi-assist camera 14 is depicted as being mounted on a vertical stabilizer of aircraft 10. Vertical-stabilizer-mounted taxi-assist camera 14 has been mounted in such an orientation so as to be capable of imaging scene 20. Scene 20 includes portions of topside 22 of aircraft 10 as well as nearby objects external to aircraft 10. Portions of topside 22 of aircraft 10 that can be imaged by vertical-stabilizer-mounted taxi-assist camera 14 include cabin 24, wings 26, 28, as well as main landing gear (not depicted in FIGS. 1A-1C).

In FIG. 1B, taxi-assist camera 16 is depicted as being mounted on a horizontal stabilizer of aircraft 10. Horizontal-stabilizer-mounted taxi-assist camera 16 has been mounted in such an orientation as to be capable of imaging scene 30. Scene 30 includes portions of wing 26 as well as nearby objects external to aircraft 10. Portions of wing 26 that can be imaged by horizontal-stabilizer-mounted taxi-assist camera 16 include a rear landing gear (not depicted), engines 32 and wing tip 34.

In FIG. 1C, taxi-assist camera 18 is depicted as being mounted beneath the fuselage of aircraft 10. Fuselage-mounted taxi-assist camera 18 has been mounted in such an orientation as to be capable of imaging scene 36. Scene 36 includes portions of forward fuselage 38 as well as nearby objects external to aircraft 10. Portions of forward fuselage 38 that can be imaged by fuselage-mounted taxi-assist camera 18 include a front landing gear (not depicted).

Each of taxi-assist cameras 14, 16, 18 may be mounted in such a way that the scene 20, 30, 36 imaged by taxi-assist cameras 14, 16, 18, respectively, differ, even if only modestly, from aircraft installation to aircraft installation. Differently oriented taxi-assist cameras 14, 16, 18 can present imagery that spans different solid angle regions of scenes to pilot 40 via cockpit display 42 on different aircraft. For example, cameras could be located on the wing tips of aircraft 10. In some embodiments, cameras could be oriented in a rear facing or In some embodiments, taxi-assist cameras 14, 16, 18 can be automatically aligned via alignment system 44, which can be located in electronics bay 46, for example.

Figure 2:
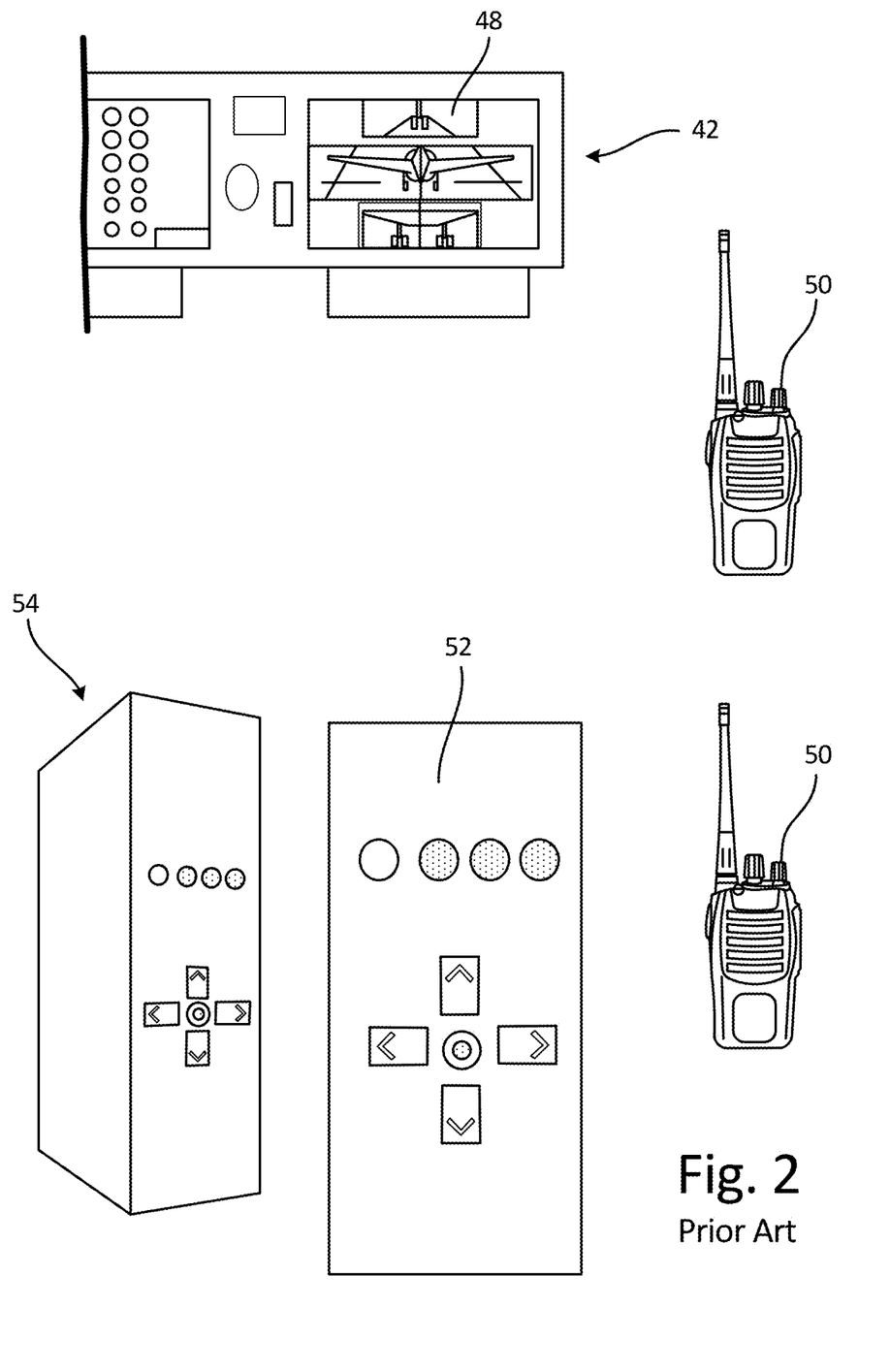
FIG. 2 is a schematic view of a taxi-assist camera system depicting a prior-art method of camera alignment.

FIG. 2 is a schematic view of a taxi-assist camera system depicting a prior-art method of camera alignment. Prior art alignment methods involve two or more technicians. A first technician may be located in a cockpit of an aircraft. The first technician may have been responsible for watching display screen 42 and for communicating to a second technician who is remotely located. The first technician may have been responsible for communicating an alignment of image 48 being displayed on display screen 42. First and second technicians may have communicated via communication devices 50, for example.

The second technician may have been located in an electronics bay of the aircraft. The second technician may have had the responsibility of adjusting the alignment of image 48 displayed on display screen 42. The second technician may have been unable to see image 48 with his own eyes as the electronics bay can be located remotely from the cockpit. The second technician may have been responsible for operating user interface 52 of image adjustment system 54, for example.

Figure 3A:
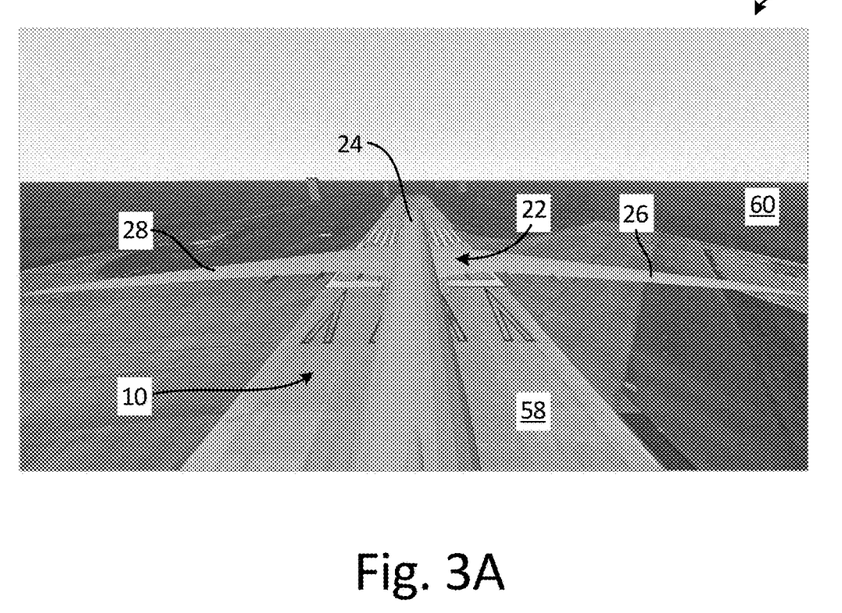
FIGS. 3A and 3B depict exemplary images, before and after image processing, respectively, taken by a taxi-assist camera located on the vertical stabilizer as depicted in FIG. 1A.
Figure 3B:
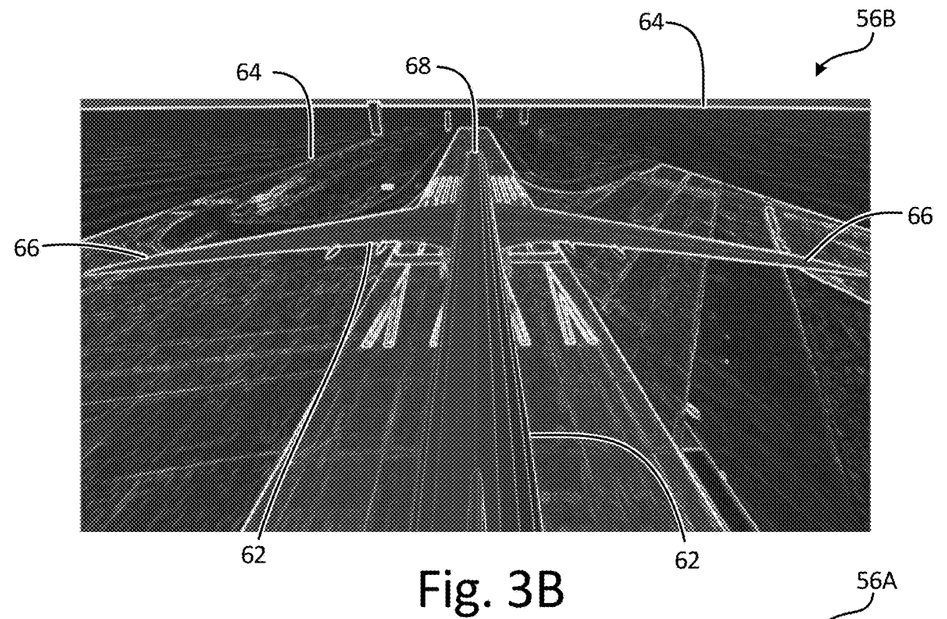
Figure 4A:
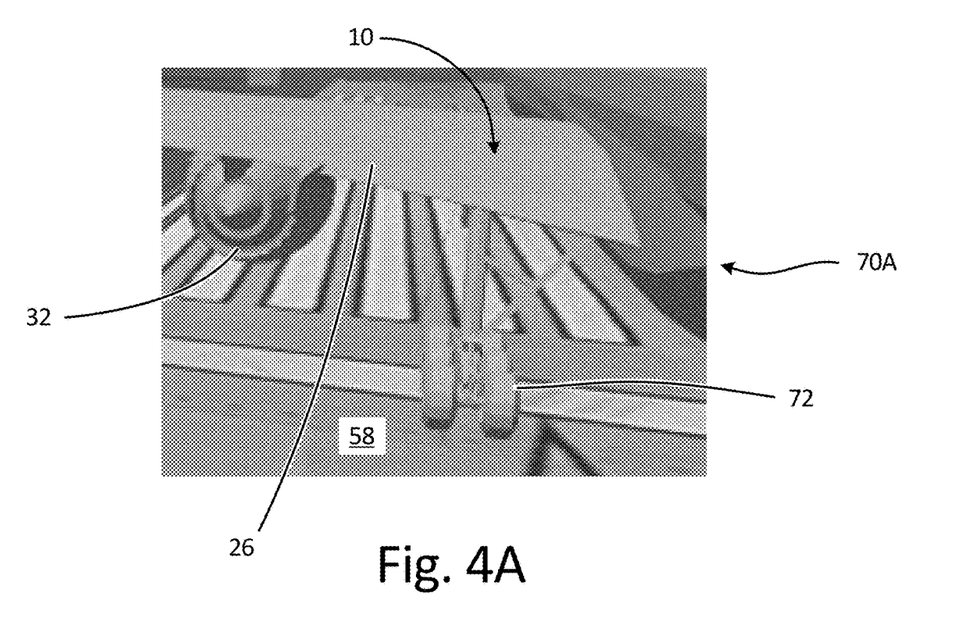
FIGS. 4A and 4B depict exemplary images, before and after image processing, respectively, taken by a taxi-assist camera located on the horizontal stabilizer as depicted in FIG. 1B.
Figure 4B:
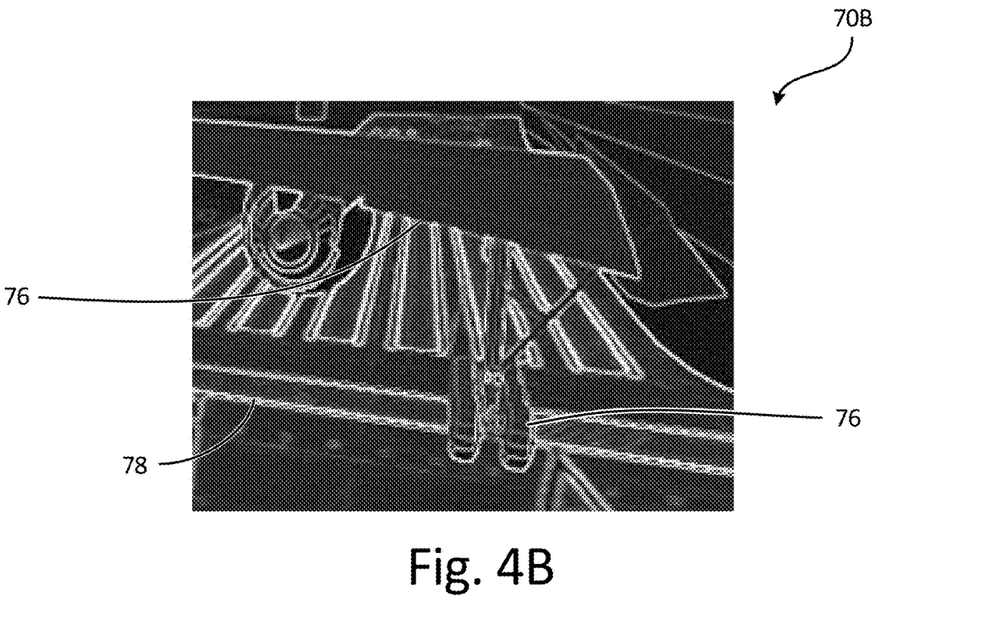
Figure 5A:
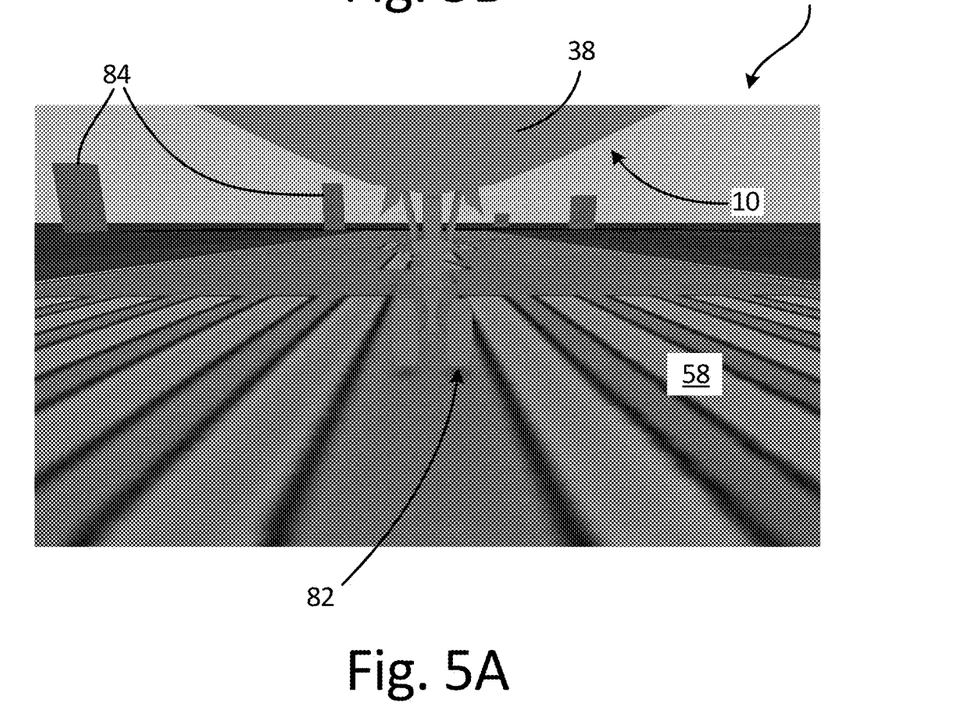
FIGS. 5A and 5B depict exemplary images, before and after image processing, respectively, taken by a taxi-assist camera located underneath the cabin, as depicted in FIG. 1C.
Figure 5B:
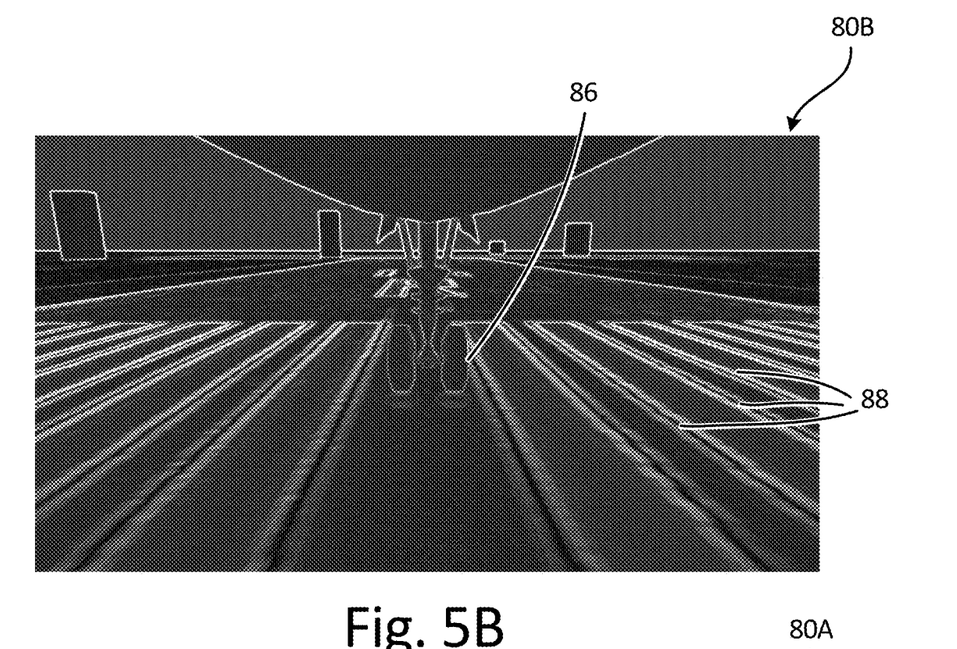

Automatically aligning a taxi-assist camera can produce imagery that is precisely aligned in a standard presentation format. Such automatic alignment can reduce the time and/or cost of manually aligning taxi-assist cameras. Aligning imagery from a taxi-assist camera so that a standard presentation is provided to a pilot can involve an alignment step and/or operation. The alignment step and/or operation can be performed at the time of installation, on a routine maintenance schedule, and/or every time a taxi-assist camera is turned on. The alignment operation can include identifying aircraft features within the imagery produced by the taxi-assist cameras, and transforming the imagery such that these identified aircraft features are located at a predetermined locations corresponding to the identified features. The step of identifying aircraft features can include various image processing operations, such as, for example, edge detection. FIGS. 3B, 4B, and 5B depict the results of an exemplary edge detection operation performed on camera imagery 3A, 4A, and 5A respectively. FIGS. 3A, 4A, and 5A show imagery from taxi-assist cameras mounted at different locations on aircraft 10.

FIGS. 3A-3B depict exemplary images, before and after image processing, respectively, taken by a taxi-assist camera 14 located on the vertical stabilizer as depicted in FIG. 1A. In FIG. 3A, image 56A depicts portions of topside 22 of aircraft 10 as well as nearby objects external to aircraft 10. Portions of topside 22 of aircraft 10 that can be imaged by vertical-stabilizer-mounted taxi-assist camera 14 include cabin 24, and wings 26, 28. Depicted nearby objects external to aircraft 10 include runway 58, and land 60 surrounding runway 58. As aircraft 10 moves, depicted nearby objects external to aircraft 10 also move within image 56A, but depicted portions of topside 22 of aircraft 10 remain stationary within image 56A. Alignment of image 56A can result in depicted portions of topside 22 of aircraft 10 being located within image 56A at standard locations. For example, cabin 24 can be horizontally centered within image 56A when aligned to a standard, and wings 26, 28 can be imaged at a standard vertical location within image 56A.

In FIG. 3B, image 56B is an image that has been processed using image 56A. Image 56B highlights high contrast edges 62, 64 of image 56A. High contrast edges 62 mark a boundary between aircraft 10 and nearby objects external to aircraft 10. High contrast edges 64 mark high differences in a reflectivity of nearby objects external to aircraft 10. High contrast edges 64, therefore, move within image 56B as aircraft 10 moves, while high contrast edges 62 remain stationary within image 56B as aircraft 10 moves. High contrast edges 62 can be used for taxi-assist camera alignment. High contrast edges 62 can be identified by camera alignment system 44 (depicted in FIG. 1A) by comparing image 56B with a reference image. Different reference images may correspond to different types of aircraft to which taxi-assist cameras have been mounted.

Specific regions of high contrast edges 62 can be used to align taxi-assist cameras 14. For example, portions corresponding to specific features of aircraft 10, such as, for example, wing tips 66 and nose tip 68 can be used to align taxi-assist camera 14. Because taxi-assist camera 14 can be mounted with a limited variation in camera orientation, the specific areas of high contrast edges 62 that are used for alignment can be located in limited regions of image 56A. In some embodiments, these limited areas of image 56B are compared with corresponding limited areas of the reference image. Relying on limited camera orientation variations can facilitate identification of the specific features of aircraft 10, as these specific features are known to be located within limited areas of image 56B. Additional processing of image 56B may improve identification of specific features used for alignment as well as improve the precision of determining a location of such specific features.

FIGS. 4A-4B depict exemplary images, before and after image processing, respectively, taken by a taxi-assist camera located on the horizontal stabilizer as depicted in FIG. 1B. In FIG. 4A, image 70A depicts portions of wing 26 as well as nearby objects external to aircraft 10. Portions of wing 26 that can be imaged by horizontal-stabilizer-mounted taxi-assist camera 16 include a rear landing gear 72, engine 32 and wing 26. Depicted nearby objects external to aircraft 10 include runway 58. As aircraft 10 moves, depicted nearby objects external to aircraft 10 also move within image 70A, but depicted portions of wing 26 of aircraft 10 remain stationary within image 70A. Alignment of image 70A can result in depicted portions of wing 26 of aircraft 10 being located within image 70A at standard locations. For example, rear landing gear 72 can be horizontally located within image 70A at a standard location when aligned, and engine 32 can be imaged at a standard vertical location within image 70A.

In FIG. 4B, image 70B is an image that has been processed using image 70A. Image 70B highlights high contrast edges 76, 78 of image 70A. High contrast edges 76 mark a boundary between aircraft 10 and nearby objects external to aircraft 10. High contrast edges 78 mark high differences in a reflectivity of nearby objects external to aircraft 10. High contrast edges 78, therefore, move within image 70B as aircraft 10 moves, while high contrast edges 76 remain stationary within image 70B as aircraft 10 moves. High contrast edges 76 can be used for taxi-assist camera alignment. High contrast edges 76 can be identified by camera alignment system 44 (depicted in FIG. 1A) by comparing image 70B with a reference image. Different reference images may correspond to different types of aircraft to which taxi-assist cameras have been mounted.

Specific regions of high contrast edges 76 can be used to align taxi-assist cameras 14. For example, portions corresponding to specific features of aircraft 10, such as, for example, wing 26 and rear landing gear 72 can be used to align taxi-assist camera 14. Because taxi-assist camera 14 can be mounted with a limited variation in camera orientation, the specific areas of high contrast edges 76 that are used for alignment can be located in limited regions of image 70A. In some embodiments, these limited areas of image 70B are compared with corresponding limited areas of the reference image. Relying on limited camera orientation variations can facilitate identification of the specific features of aircraft 10, as these specific features are known to be located within limited areas of image 70B. Additional processing of image 70B may improve identification of specific features used for alignment as well as improve the precision of determining a location of such specific features.

FIGS. 5A-5B depict exemplary images, before and after image processing, respectively, taken by a taxi-assist camera located underneath the cabin as depicted in FIG. 1C. Such a camera location can be called a nose gear view. In FIG. 4A, image 80A includes portions of forward fuselage 38 as well as nearby objects external to aircraft 10. Portions of forward fuselage 38 that can be imaged by fuselage mounted taxi-assist camera 16 include front landing gear 82. Depicted nearby objects external to aircraft 10 include runway 58 and buildings 84 located adjacent to runway 58. As aircraft 10 moves, depicted nearby objects external to aircraft 10 also move within image 80A, but depicted portions of front landing gear 82 of aircraft 10 remain stationary within image 80A. Alignment of image 80A can result in depicted portions of landing gear 82 of aircraft 10 being located within image 80A at standard locations. For example, front landing gear 82 can be horizontally and vertically located within image 80A at standard locations when aligned.

In FIG. 5B, image 80B is an image that has been processed using image 80A. Image 80B highlights high contrast edges 86, 88 of image 80A. High contrast edges 86 mark a boundary between aircraft 10 and nearby objects external to aircraft 10. High contrast edges 88 mark high differences in a reflectivity of nearby objects external to aircraft 10. High contrast edges 88, therefore, move within image 80B as aircraft 10 moves, while high contrast edges 86 remain stationary within image 80B as aircraft 10 moves. High contrast edges 86 can be used for taxi-assist camera alignment. High contrast edges 86 can be identified by camera alignment system 44 (depicted in FIG. 1A) by comparing image 80B with a reference image. Different reference images may correspond to different types of aircraft to which taxi-assist cameras have been mounted.

Specific regions of high contrast edges 86 can be used to align taxi-assist cameras 14. For example, portions corresponding to specific features of aircraft 10, such as, for example, front landing gear 82 can be used to align taxi-assist camera 14. Because taxi-assist camera 14 can be mounted with a limited variation in camera orientation, the specific areas of high contrast edges 86 that are used for alignment can be located in limited regions of image 80A. In some embodiments, these limited areas of image 80B are compared with corresponding limited areas of the reference image. Relying on limited camera orientation variations can facilitate identification of the specific features of aircraft 10, as these specific features are known to be located within limited areas of image 80B. Additional processing of image 80B may improve identification of specific features used for alignment as well as improve the precision of determining a location of such specific features.

Figure 6:
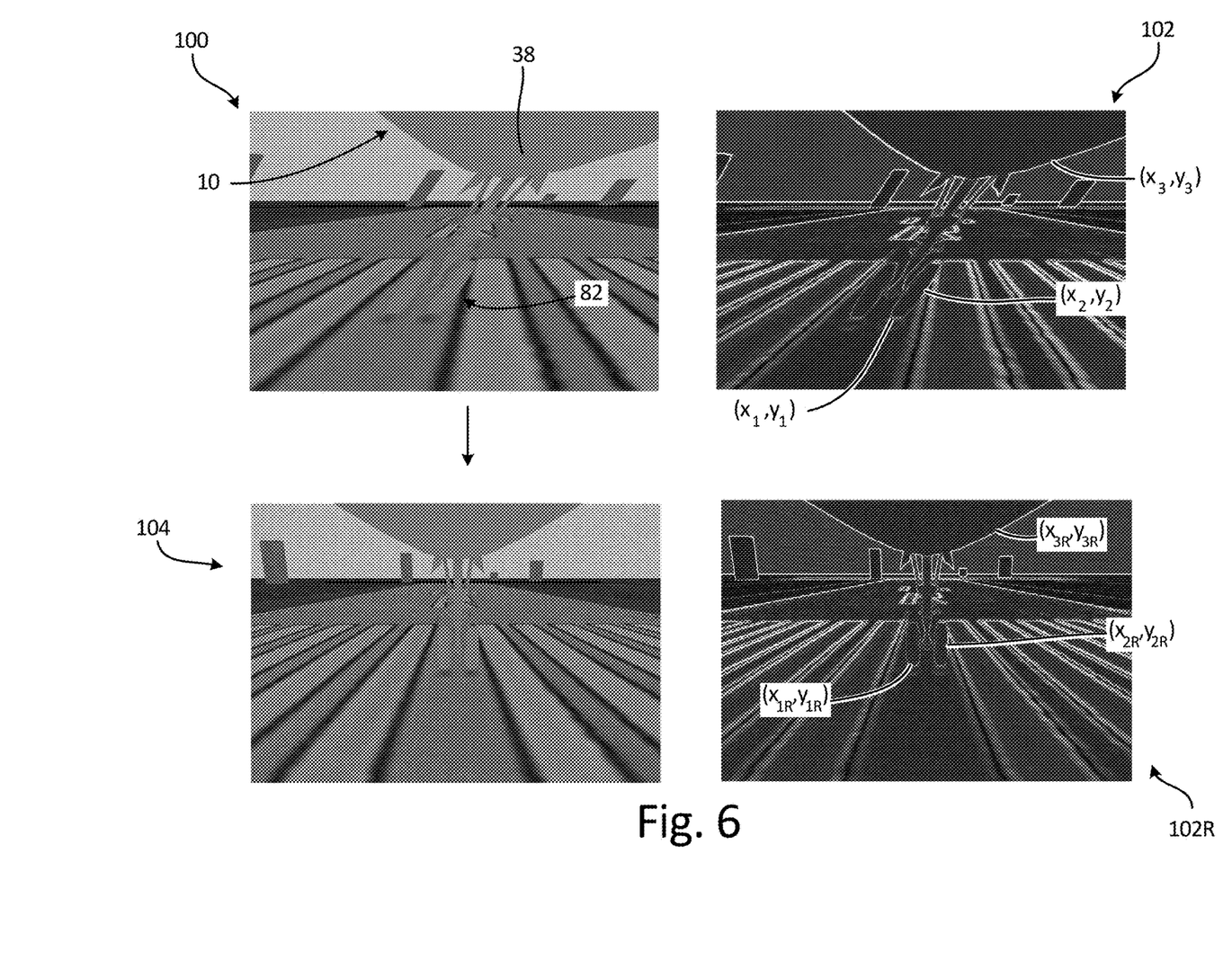
FIG. 6 is a schematic representation of exemplary transformations that align images from a taxi-assist camera.

FIG. 6 is a schematic representation of exemplary transformations that align images from a taxi-assist camera. In FIG. 6, taxi-assist camera 14 (shown in FIG. 1) has produced raw image 100. Front landing gear 82 and forward fuselage 38 of aircraft 10 have been identified in raw image 100. Edge image 102 has been produced using edge enhancement operations upon raw image 100. Edges of front landing gear

82 and forward fuselage 38 are highlighted by the edge enhancement used to produce edge image 102. Reference image 102R also highlights edges of front landing gear 82 and forward fuselage 38. Locations $(x_1, y_1)$, $(x_2, y_2)$, and $(x_3, y_3)$ corresponding to a bottom of front landing gear 82, a lateral side of front landing gear 82 and a bottom of forward fuselage 38, respectively, have been calculated using edge image 102. Reference locations 106R, 108R, 110R, corresponding to the bottom of front landing gear 82, the lateral side of front landing gear 82 and the bottom of forward fuselage 38, respectively, have been calculated using reference image 102R. Locations $(x_1, y_1)$, $(x_2, y_2)$, and $(x_3, y_3)$ are compared with reference locations $(x_{1R}, y_{1R})$, $(x_{2R}, y_{2R})$, and $(x_{3R}, y_{3R})$.

If each of locations $(x_1, y_1)$, $(x_2, y_2)$, and $(x_3, y_3)$ are misaligned from corresponding reference locations $(x_{1R}, y_{1R})$, $(x_{2R}, y_{2R})$, and $(x_{3R}, y_{3R})$, respectively, by the same x-y translation distance, then an x-y translation can be performed to align taxi-assist camera 15 so as to produce images that present front landing gear 82 and forward fuselage 38 in locations corresponding to standard reference locations $(x_{1R}, y_{1R})$, $(x_{2R}, y_{2R})$, and $(x_{3R}, y_{3R})$. If, however, each of locations $(x_1, y_1)$, $(x_2, y_2)$, and $(x_3, y_3)$ are misaligned from corresponding reference locations $(x_{1R}, y_{1R})$, $(x_{2R}, y_{2R})$, and $(x_{3R}, y_{3R})$, respectively, by different x-y translation distances, then magnification/reduction, rotation, and/or shear might also be used to produce images that present wing tips 66 and nose tip 68 in locations corresponding to standard reference locations $(x_{1R}, y_{1R})$, $(x_{2R}, y_{2R})$, and $(x_{3R}, y_{3R})$.

Thus, selection of method of transformation is performed. After such a selection an image transformation operator corresponding to the selected method of transformation is generated. The generated transformation operator is then applied to the real-time video streamed from taxi-assist camera 14 to produce aligned image 104. Aligned image 104 may be cropped so that the entire x-y domain of image 104 includes active imagery calculated from pixel data of taxi-assist camera 14. In other words, the solid angle imaged by a focal plane array of taxi-assist camera 14 can be greater than the solid angle displayed by cockpit display 42, so that even after transformation of raw image 100, cockpit display 42 will not have edge portions outside of the solid angle imaged by the focal plane array.

In various embodiments, edge image 102 may be generated using various edge detection algorithms. In an exemplary embodiment a Sobel filter may be used to detect a spatial gradient in raw image 100. In some embodiments, horizontal and vertical gradients may be sequentially detected. For example horizontal edges may be detected using a horizontal gradient detection filter on raw image 100, and then vertical edges may be detected using a vertical gradient filter on raw image 100. Separate images including the horizontal and vertical edges can then be combined by summing the square of both of these separate images, for example.

In some embodiments image alignment can be performed using x-y translation. In some embodiments, image alignment can be performed using image rotation. In some embodiments image alignment can be performed using image shear. In some embodiments, image alignment can be performed using image magnification/reduction. In some embodiments, image alignment can be performed using perspective projections. For example, affine transformations can be used to provide a standard presentation of images. In some embodiments, various combinations of the above transformations can be used.

Figure 7:
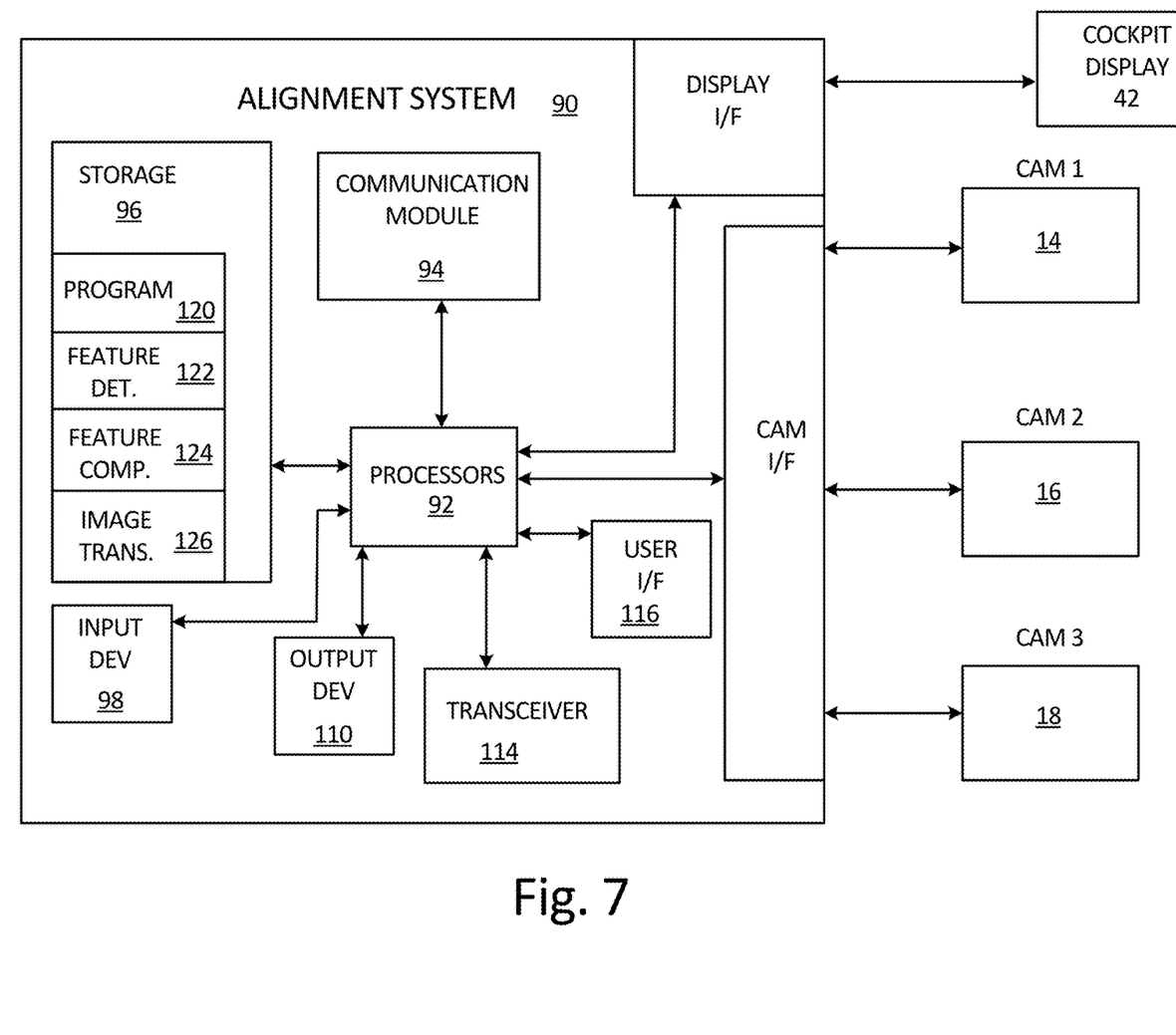
FIG. 7 is a block diagram of an exemplary alignment system for aligning a taxi-assist camera.

FIG. 7 is a block diagram of an exemplary alignment system for aligning a taxi-assist camera. In FIG. 7, taxi-assist camera system 12 includes taxi-assist camera 14, 16, 18, alignment system 90 and cockpit display 42. Alignment system 90 can be any device capable of executing computer-readable instructions defining a software program implementing long-range cloud conditions detection. Examples of alignment system 90 can include, but are not limited to, laptop computers, mobile phones (including smartphones), tablet computers, personal digital assistants (PDAs), desktop computers, servers, mainframes, or other computing devices. In some examples, alignment system 90 can be an avionics unit configured for use on an aerial vehicle, such as a helicopter, unmanned aerial vehicle (UAV), or other aircraft.

As illustrated in FIG. 7, alignment system 90 includes processor 92, communications module 94, storage system 96, input device(s) 98, output devices 110, transceivers 114, and user interface 116. However, in certain examples, alignment system 90 can include more or fewer components. For instance, in examples where alignment system 90 is an avionics unit, alignment system 90 may not include input device(s) 98 and/or output device(s) 110. In some examples, such as where alignment system 90 is a mobile or portable device such as a laptop computer, alignment system 90 may include additional components such as a battery that provides power to components of alignment system 90 during operation.

Processor(s) 92, in one example, are configured to implement functionality and/or process instructions for execution within alignment system 90. For instance, processor(s) 92 can be capable of processing instructions stored in storage device(s) 96. Examples of processor(s) 92 can include any one or more of a microprocessor, a controller, a digital signal processor (DSP), an application specific integrated circuit (ASIC), a field-programmable gate array (FPGA), or other equivalent discrete or integrated logic circuitry.

Storage device(s) 96 can be configured to store information within alignment system 90 during operation. Storage device(s) 96, in some examples, are described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, storage device(s) 96 are a temporary memory, meaning that a primary purpose of storage device(s) 96 is not long-term storage. Storage device(s) 96, in some examples, are described as volatile memory, meaning that storage device(s) 96 do not maintain stored contents when power to alignment system 90 is turned off. Examples of volatile memories can include random access memories (RAM), dynamic random access memories (DRAM), static random access memories (SRAM), and other forms of volatile memories. In some examples, storage device(s) 96 are used to store program instructions for execution by processor(s) 92. Storage device(s) 96, in one example, are used by software or applications running on alignment system 90 (e.g., a software program implementing long-range cloud conditions detection) to temporarily store information during program execution.

Storage device(s) 96, in some examples, also include one or more computer-readable storage media. Storage device(s) 96 can be configured to store larger amounts of information than volatile memory. Storage device(s) 96 can further be configured for long-term storage of information. In some examples, storage device(s) 96 include non-volatile storage elements. Examples of such non-volatile storage elements can include magnetic hard discs, optical discs, flash memories, or forms of electrically programmable memories (EPROM) or electrically erasable and programmable (EEPROM) memories. Storage device(s) 96 can include program segments 120, feature detector segment 122, feature comparator segment 124, and image transformation segment 126.

Alignment system 90, in some examples, also includes communications module 94. Alignment system 90, in one example, utilizes communications module 94 to communicate with external devices via one or more networks, such as one or more wireless or wired networks or both. Communications module 94 can be a network interface card, such as an Ethernet card, an optical transceiver, a radio frequency transceiver, or any other type of device that can send and receive information. Other examples of such network interfaces can include Bluetooth, 3G, 4G, and WiFi radio computing devices as well as Universal Serial Bus (USB).

Alignment system 90, in some examples, also includes input device(s) 98. Input device(s) 98, in some examples, are configured to receive input from a user. Examples of input device(s) 98 can include a mouse, a keyboard, a microphone, a camera device, a presence-sensitive and/or touch-sensitive display, push buttons, arrow keys, or other type of device configured to receive input from a user. In some embodiments, input and output communication with the aircraft can be performed via a communications bus, such as, for example, an Aeronautical Radio, Incorporated (ARINC) standard communications protocol.

Output device(s) 110 can be configured to provide output to a user. Examples of output device(s) 110 can include a display device, a sound card, a video graphics card, a speaker, a cathode ray tube (CRT) monitor, a liquid crystal display (LCD), a light emitting diode (LED) display, an organic light emitting diode (OLED) display, or other type of device for outputting information in a form understandable to users or machines.

Accordingly, alignment system 90 illustrates one example embodiment of a device that can execute a software and/or firmware program including a plurality of segments that each includes one or more modules implementing an interface that enables direct communication between the respective module and modules that are members of any other of the plurality of segments.

Figure 8:
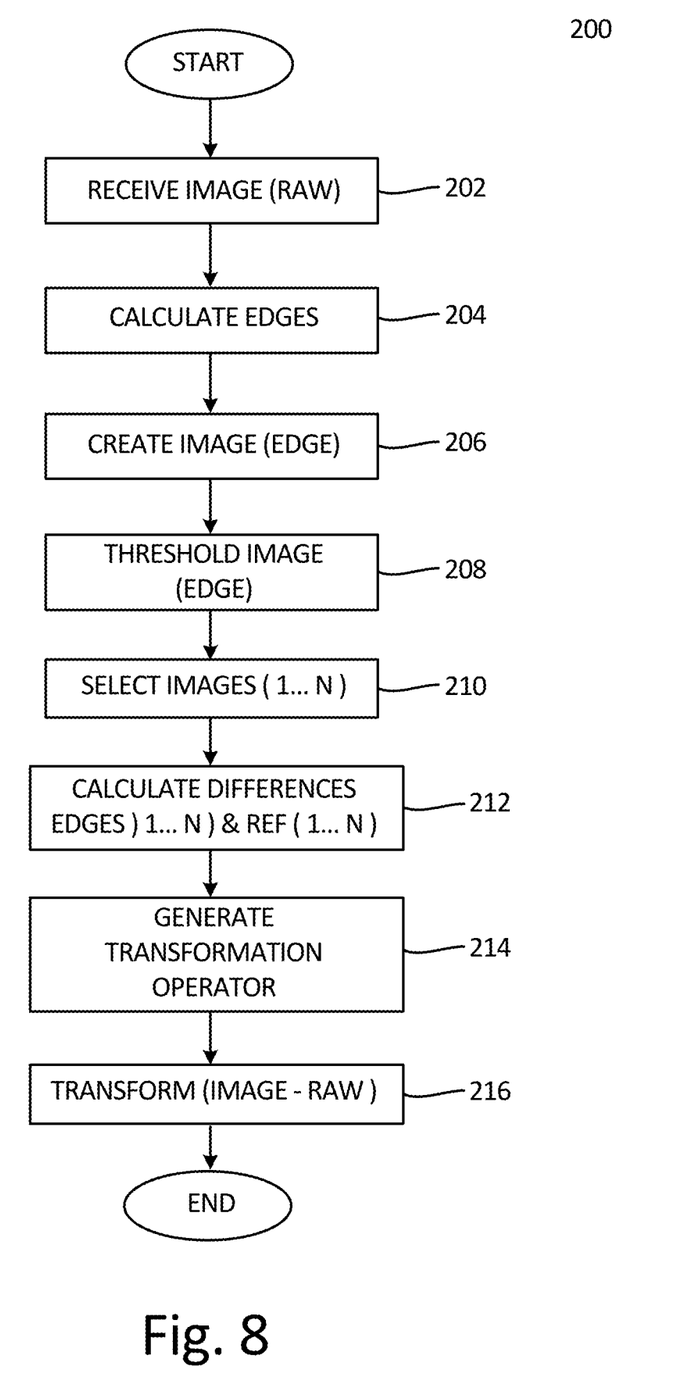
FIG. 8 is a flow chart of an exemplary method of aligning a taxi-assist camera.

FIG. 8 is a flow chart of an exemplary method of aligning a taxi-assist camera. In FIG. 8, method 200 is depicted from the vantage point of processor(s) 92 of FIG. 7. Method 200 begins at step 202 where processor(s) 92 receives a raw image from one of cameras. The raw image includes a two-dimensional array of pixel intensity data. Then, at step 204, processor(s) 92 calculates edge intensity data within the received raw image. The calculated edge intensity data can be obtained by taking a difference between pixel intensity data of pixels within a local vicinity. The method then proceeds to step 206 where processor(s) 92 creates an edge image that includes a two-dimensional array of the calculated edge intensity data. The method proceeds to step 208 where processor thresholds the second image to zero the magnitude of edge intensity data that are below a predetermined threshold, while edge intensity data that are above the predetermined threshold survive.

The following are non-exclusive descriptions of possible embodiments of the present invention.

An alignment system includes a taxi-assist camera configured to be mounted to an aircraft and oriented to provide real-time video during taxi operations of both a specific feature(s) of the aircraft and of nearby objects external to the aircraft. The real-time video includes a time sequence of image frames. Each of the image frames of the time sequence includes a two-dimensional array of pixel data. The alignment system includes a feature detector configured to detect the specific feature(s) of the aircraft within at least one of the image frames. The alignment system includes a feature comparator configured to compare the detected specific feature(s) within the at least one of the image frames with a reference feature within a reference image. The alignment system also includes an image transformation operator configured to transform each of the image frames of the real-time video into a transformed image frame such that the detected specific feature(s) is located at a two-dimensional location within each of the transformed image frames. The two-dimensional location within each of the transformed image frames corresponds to a two-dimensional reference location corresponding to the reference feature within the reference image.

The alignment system of the preceding paragraph can optionally include, additionally and/or alternatively, an edge detector configured to generate at least one edge image corresponding to the at least one of the image frames. The edge image can include a two-dimensional array of pixel data. Each of the pixel data can be a function of a difference between pixels located within a distance of threshold of one another.

A further embodiment of any of the foregoing alignment systems, wherein the edge detector includes a Sobel filter to measure a two-dimensional spatial gradient of the at least one image frame. A further embodiment of any of the foregoing alignment systems, wherein the feature detector can include a noise reducer configured to zero the pixel data of the at least one edge image for pixels that have an amplitude that is less than a threshold. A further embodiment of any of the foregoing alignment systems, wherein the noise reducer can be further configured to adaptively set the threshold so that fewer than a predetermined number of pixels have amplitudes that are not less than the threshold, and thereby are not zeroed.

A further embodiment of any of the foregoing alignment systems, wherein the feature detector can be further configured to detect a first feature having a first orientation within the two-dimensional array of pixel data, and a second feature having a second orientation not parallel to the first orientation within the two-dimensional array of pixel data. A further embodiment of any of the foregoing alignment systems, wherein the feature comparator can be further configured to compare the first feature within the at least one of the image frames with a first reference feature within the reference image, and to compare the second feature within the at least one of the image frames with a second reference feature within the reference image.

A further embodiment of any of the foregoing alignment systems, wherein the image transformation operator is an image translation operator. The image translation operator can be configured to translate each of the image frames of the real-time video both horizontally and vertically so as to translate both the first and second image features to locations within the image frames corresponding to the first and second reference features, respectively. A further embodiment of any of the foregoing alignment systems, wherein the image transformation operator is an image translation and rotation operator. The image translation and rotation operator can be configured to translate both horizontally and vertically and rotate each of the image frames of the real-time video so as to transform both the first and second image features to locations within the image frames corresponding to the first and second reference features, respectively. A further embodiment of any of the foregoing alignment systems, wherein the image transformation operator is an image translation, rotation, and shear operator. The image translation, rotation and shear operator can be configured to translate both horizontally and vertically, rotate and shear each of the image frames of the real-time video so as to transform both the first and second image features to locations within the image frames corresponding to the first and second reference features, respectively.

A further embodiment of any of the foregoing alignment systems, wherein the feature detector can be configured to only detect features located within a two-dimensional sub-array of pixel data. A further embodiment of any of the foregoing alignment systems, wherein the feature(s) include the landing gear of the aircraft. A further embodiment of any of the foregoing alignment systems, wherein the feature(s) include the wing of the aircraft.

A further embodiment of any of the foregoing alignment systems can further include an image cropper configured to crop the transformed image frames of the real-time video so as make a standard presentation of the image frames, the standard presentation having the feature(s) located in a standard location with respect to edges of the image frames. A further embodiment of any of the foregoing alignment systems, wherein the edge detector can be further configured to reduce a thickness of edge image features to less than a predetermined thickness.

A method for aligning a taxi-assist camera of an aircraft to a standard view includes obtaining a first image from a camera mounted on an aircraft, the first image comprising a two-dimensional array of pixel intensity data. The method includes calculating edge intensity data using the obtained first image. The calculating uses a function of differences between pixel intensity data of pixels within a local vicinity. The method includes creating a second image comprising a two-dimensional array of the calculated edge intensity data. The method includes thresholding the second image to zero the magnitude of edge intensity data that are below a predetermined threshold, while edges intensity data that are above the predetermined threshold survive. The method includes selecting, from the surviving edges, a first target edge oriented in a first orientation and a second target edge oriented in a second orientation. The first and second orientations provide a basis that spans the two-dimensional array of edge intensity data. The method includes calculating a first offset between the selected first edge and a first reference location and a second offset between the selected second edge and a second reference location. The method includes generating a transformation operator that transforms the second image such that the selected first edge is located at the first reference location and the selected second edge is located at the second reference location. The method also includes applying the generated transformation operator in real-time to imagery obtained by the camera mounted on the aircraft.

The method of the preceding paragraph can optionally include, additionally and/or alternatively, thinning the calculated edges that have a thickness greater than a threshold number of pixel widths. A further embodiment of any of the foregoing methods, wherein generating a transformation operator includes calculating a translation operation. A further embodiment of any of the foregoing methods, wherein generating a transformation operator includes calculating a rotation operation. A further embodiment of any of the foregoing methods, wherein generating a transformation operator includes calculating a shear operation.

The method then proceeds to step 210 where processor(s) 92 selects, from the surviving edges, a first target edge oriented in a first orientation and a second target edge oriented in a second orientation, the first and second orientations providing a basis that spans the two-dimensional array of edge intensity data. Then at step 212, processor(s) 92 calculates a first offset between the selected first edge and a first reference location and a second offset between the selected second edge and a second reference location. The method proceeds to step 214 where processor(s) 92 generates a transformation operator that transforms the second image such that the selected first edge is located at the first reference location and the selected second edge is located at the second reference location. Then, at step 216, processor(s) 92 applies the generated transformation operator in real-time to imagery obtained by the camera mounted on the aircraft, and method 200 ends.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An alignment system comprising:
   a taxi-assist camera configured to be mounted to an aircraft and oriented to provide real-time video during taxi operations of both a specific feature(s) of the aircraft and of nearby objects external to the aircraft, the real-time video comprising a time sequence of image frames, each image frame including a two-dimensional array of pixel data;
   a feature detector configured to detect the specific feature(s) of the aircraft within at least one of the image frames;
   a feature comparator configured to compare the detected specific feature(s) within the at least one of the image frames with a reference feature within a reference image, the feature detector comprising a noise reducer configured to zero the pixel data of the at least one edge image for pixels that have an amplitude that is less than a threshold, wherein the noise reducer is further configured to adaptively set the threshold so that fewer than a predetermined number of pixels have amplitudes that are not less than the threshold, and thereby are not zeroed; and
   an image transformation operator configured to transform each of the image frames of the real-time video into a transformed image frame such that the detected specific feature(s) is located at a two-dimensional location(s) within each of the transformed image frames, the two-dimensional location within each of the transformed image frames corresponding to a two-dimensional reference location corresponding to the reference feature within the reference image.

2. The alignment system of claim 1, wherein the feature detector comprises:
   an edge detector configured to generate at least one edge image corresponding to the at least one of the image frames, the edge image comprising a two-dimensional array of pixel data, each of the pixel data being a function of a difference between pixels located within a distance of threshold of one another.

3. The alignment system of claim 2, wherein the edge detector comprises:
a Sobel filter to measure a two-dimensional spatial gradient of the at least one image frame.

4. The alignment system of claim 2, wherein the edge detector is further configured to reduce a thickness of edge image features to less than a predetermined thickness.

5. The alignment system of claim 1, wherein the feature detector is further configured to detect a first feature having a first orientation within the two-dimensional array of pixel data, and a second feature having a second orientation not parallel to the first orientation within the two-dimensional array of pixel data.

6. The alignment system of claim 5, wherein the feature comparator is further configured to compare the first feature within the at least one of the image frames with a first reference feature within the reference image, and to compare the second feature within the at least one of the image frames with a second reference feature within the reference image.

7. The alignment system of claim 6, wherein the image transformation operator is an image translation operator, the image translation operator configured to translate each of the image frames of the real-time video both horizontally and vertically so as to translate both the first and second reference features, respectively.

8. The alignment system of claim 6, wherein the image transformation operator is an image translation operator, the image translation operator configured to translate both horizontally and vertically and rotate each of the image frames of the real-time video so as to transform both the first and second image features to locations within the image frames corresponding to the first and second reference features, respectively.

9. The alignment system of claim 6, wherein the image transformation operator is an image translation, rotation, and shear operator, the image translation, rotation and shear operator configured to translate both horizontally and vertically, rotate and shear each of the image frames of the real-time video so as to transform both the first and second image features to locations within the image frames corresponding to the first and second reference features, respectively.

10. The alignment system of claim 1, wherein the feature detector is configured to only detect features located within a two-dimensional subarray of pixel data.

11. The alignment system of claim 10, further comprising an image cropper configured to crop the transformed image frames of the real-time video so as to make a standard presentation if the image frames, the standard presentation having the feature(s) located in a standard location with respect to edges of the image frames.

12. The alignment system of claim 1, wherein the feature(s) comprise the landing gear of the aircraft.

13. The alignment system of claim 1, wherein the feature(s) comprise the wing of the aircraft.

14. A method for aligning taxi-assist camera of an aircraft to a standard view, the method comprising the steps of:
obtaining a first image from a camera mounted on an aircraft, the first image comprising a two-dimensional array of pixel intensity data;
calculating edge intensity data using the obtained first image, wherein the calculating uses a function of differences between pixel intensity data of pixels within a local vicinity;
creating a second image comprising a two-dimensional array of the calculated edge intensity data;
thresholding the second image to zero the magnitude of edge intensity data that are below a threshold, while edges intensity data that are above the threshold survive;
adaptively setting the threshold so that fewer than a predetermined number of pixels have amplitudes that are not less than the threshold, and thereby are not zeroed;
selecting, from the surviving edges, a first target edge oriented in a first orientation and a second target edge oriented in a second orientation, the first and second orientations providing a basis that spans the two-dimensional array of edge intensity data;
calculating a first offset between the selected first edge and a first reference location and a second offset between the selected second edge and a second reference location;
generating a transformation operator that transforms the second image such that the selected first edge is located at the first reference location and the selected second edge is located at the second reference location; and
applying the generated transformation operator in real-time during taxi operations to imagery obtained by the camera mounted on the aircraft.

15. The method of claim 14, wherein generating a transformation operator comprises:
calculating a translation operation.

16. The method of claim 14, wherein generating a transformation operator comprises:
calculating a rotation operation.

17. The method of claim 14, wherein generating a transformation operator comprises:
calculating a shear operation.

18. The method of claim 14, further comprising:
thinning the calculated edges that have a thickness greater than a threshold number of pixel widths.

* * * * *